US012334765B2

(12) United States Patent
Lu et al.

(10) Patent No.: US 12,334,765 B2
(45) Date of Patent: Jun. 17, 2025

(54) GRID CONNECTION CONTROL METHOD OF ENERGY STORAGE APPARATUS, UNIT, SYSTEM, AND STORAGE MEDIUM

(71) Applicant: CONTEMPORARY AMPEREX FUTURE ENERGY RESEARCH INSTITUTE (SHANGHAI) LIMITED, Shanghai (CN)

(72) Inventors: Yanhua Lu, Shanghai (CN); Dongxu Yu, Shanghai (CN); Bingtuan Luo, Shanghai (CN)

(73) Assignee: CONTEMPORARY AMPEREX FUTURE ENERGY RESEARCH INSTITUTE (SHANGHAI) LIMITED, Shanghai (CN)

( * ) Notice: Subject to any disclaimer, the term of this patent is extended or adjusted under 35 U.S.C. 154(b) by 0 days.

(21) Appl. No.: 19/006,595

(22) Filed: Dec. 31, 2024

(65) Prior Publication Data

US 2025/0132583 A1 Apr. 24, 2025

Related U.S. Application Data

(63) Continuation of application No. PCT/CN2022/129263, filed on Nov. 2, 2022.

(51) Int. Cl.
*H02J 7/00* (2006.01)
*H02J 7/06* (2006.01)

(52) U.S. Cl.
CPC ........ *H02J 7/0048* (2020.01); *H02J 7/00032* (2020.01); *H02J 7/0014* (2013.01); *H02J 7/06* (2013.01)

(58) Field of Classification Search
CPC .................................................. H02J 7/0048
(Continued)

(56) References Cited

U.S. PATENT DOCUMENTS 9,843,075 B2 * 12/2017 Partes ............... H01M 10/4257
2013/0051105 A1 * 2/2013 Wang ...................... H02M 1/42
363/132

(Continued)

FOREIGN PATENT DOCUMENTS

CN 102969882 B 1/2015
CN 109327050 A 2/2019
(Continued)

OTHER PUBLICATIONS

The World Intellectual Property Organization (WIPO) International Search Report and Written Opinion for PCT/CN2022/129263 Jun. 21, 2023 11 Pages (including translation).

*Primary Examiner* — Jerry D Robbins
(74) *Attorney, Agent, or Firm* — ANOVA LAW GROUP, PLLC

(57) ABSTRACT

A grid connection control method of an energy storage apparatus, an energy storage control unit, an energy storage system, and a storage medium are provided and relate to the field of energy storage technologies, where the method includes: sequentially controlling energy storage units of energy storage sub-modules to be connected to corresponding voltage-sharing capacitors in a state in which a main energy transmission circuit is disconnected from a direct-current bus, so as to make the energy storage units pre-charge the corresponding voltage-sharing capacitors; and controlling the main energy transmission circuit to be connected to the direct-current bus under a condition that the voltage-sharing capacitor of each energy storage sub-module meets a voltage-sharing capacitor pre-charge completion condition.

20 Claims, 9 Drawing Sheets

(58) Field of Classification Search
USPC .......................................................... 320/137
See application file for complete search history.

(56) References Cited

U.S. PATENT DOCUMENTS

| | | | |
|---|---|---|---|
| 2013/0154379 A1* | 6/2013 | Tiefenbach | B60L 58/21 |
| | | | 307/77 |
| 2015/0130420 A1* | 5/2015 | Fassnacht | B60L 8/003 |
| | | | 320/137 |
| 2016/0241070 A1 | 8/2016 | Aronov et al. | |
| 2020/0091564 A1* | 3/2020 | Moen | H01M 10/6567 |
| 2020/0112065 A1* | 4/2020 | Eliassen | H02J 7/0025 |
| 2023/0187930 A1* | 6/2023 | Reimann | H02J 1/084 |
| | | | 363/65 |

FOREIGN PATENT DOCUMENTS

| | | |
|---|---|---|
| CN | 111181207 A | 5/2020 |
| CN | 112542893 A | 3/2021 |
| CN | 109217379 B | 11/2021 |
| CN | 114188967 A | 3/2022 |
| CN | 114597954 A | 6/2022 |

\* cited by examiner

GRID CONNECTION CONTROL METHOD OF ENERGY STORAGE APPARATUS, UNIT, SYSTEM, AND STORAGE MEDIUM

CROSS-REFERENCE TO RELATED APPLICATION

This application is a continuation of International Application No. PCT/CN2022/129263, filed on Nov. 2, 2022, the entire content of which is incorporated herein by reference.

TECHNICAL FIELD

This application relates to the field of energy storage technologies, in particular, to a grid connection control method of an energy storage apparatus, an energy storage control unit, an energy storage system, and a storage medium.

BACKGROUND

At present, energy storage apparatuses can be charged by being connected to a direct-current bus of an electric power system. The energy storage apparatuses may be various energy storage apparatuses, for example, the energy storage apparatus includes a plurality of energy storage sub-modules connected in series. With the energy storage apparatus being connected to the direct-current bus, the electric power system outputs electrical energy through the direct-current bus to charge the energy storage apparatus. When the direct-current bus is electrified, instantaneous impulse current and impulse voltage are generated when the energy storage apparatus is connected to the direct-current bus for grid connection. Excessively large instantaneous impulse current and impulse voltage cause significant damage to the energy storage apparatus, short the service life of the energy storage apparatus, affect the use safety of the energy storage apparatus, and may cause damage to an accessed power grid and other devices in the power grid during grid connection of the energy storage apparatus.

SUMMARY

This disclosure provides a grid connection control method of an energy storage apparatus, an energy storage control unit, an energy storage system, and a storage medium, which can effectively improve the grid connection reliability and safety of the energy storage apparatus.

A first aspect of this disclosure provides a grid connection control method of an energy storage apparatus. The energy storage apparatus includes a plurality of energy storage sub-modules. The energy storage sub-module includes a power unit and an energy storage unit. The power unit includes a rectifying circuit and a voltage-sharing capacitor. The energy storage unit and the voltage-sharing capacitor are respectively connected in parallel with an output end of the rectifying circuit. In addition, the energy storage unit is capable of being connected to or disconnected from the output end of the rectifying circuit. Input ends of all the rectifying circuits are connected in series to form a main energy transmission circuit. The main energy transmission circuit is capable of being connected to or disconnected from a direct-current bus of an electric power system. The method includes: sequentially controlling the energy storage units of the energy storage sub-modules to be connected to corresponding voltage-sharing capacitors in a state in which the main energy transmission circuit is disconnected from the direct-current bus, so as to make the energy storage units pre-charge the corresponding voltage-sharing capacitors; and controlling the main energy transmission circuit to be connected to the direct-current bus under a condition that the voltage-sharing capacitor of each energy storage sub-module meets a voltage-sharing capacitor pre-charge completion condition.

Optionally, under a condition that the main energy transmission circuit is connected to the direct-current bus, the energy storage units of the energy storage sub-modules are controlled to be connected to the corresponding rectifying circuits according to a control policy to implement a charging treatment.

Optionally, the controlling the energy storage units of the energy storage sub-modules to be connected to the corresponding rectifying circuits according to a control policy to implement a charging treatment includes: selecting an energy storage sub-module as a charging energy storage sub-module based on SOC information of the energy storage sub-module, and controlling the charging energy storage sub-module to be connected to a corresponding rectifying circuit to implement a charging treatment under a condition that the main energy transmission circuit is connected to the direct-current bus.

Optionally, the selecting an energy storage sub-module as a charging energy storage sub-module based on SOC information of the energy storage sub-module includes: determining a corresponding participation quantity of energy storage sub-modules participating in charging; determining, based on the participation quantity, a variation of the quantity of the energy storage sub-modules participating in charging under a condition that the participation quantity is greater than 0 and less than a total quantity of the energy storage sub-modules; and selecting, based on the SOC information and the variation of the energy storage sub-module, the energy storage sub-module as a charging energy storage sub-module by using a SOC sequencing and balancing policy.

Optionally, the selecting, based on the SOC information and the variation of the energy storage sub-module, the energy storage sub-module as a charging energy storage sub-module by using a SOC sequencing and balancing policy includes: under a condition that the variation is equal to 0 and a maximum SOC deviation is greater than a SOC deviation threshold, selecting an energy storage sub-module with a smallest SOC among all the energy storage sub-modules that are not selected as the charging energy storage sub-modules as a new charging energy storage sub-module; and selecting an energy storage sub-module with a largest SOC among all the charging energy storage sub-modules as a to-be-excised energy storage sub-module; where the maximum SOC deviation is the difference between a maximum SOC and a minimum SOC of the energy storage sub-module.

Optionally, the selecting, based on the SOC information and the variation of the energy storage sub-module, the energy storage sub-module as a charging energy storage sub-module by using a SOC sequencing and balancing policy includes: under a condition that the variation is greater than 0 and the electric power system outputs electrical energy to the main energy transmission circuit, selecting an energy storage sub-module with a smallest SOC and a quantity equal to the variation among all the energy storage sub-modules that are not selected as the charging energy storage sub-modules as a new charging energy storage sub-module; or under a condition that the variation is greater than 0 and the main energy transmission circuit outputs electrical energy to the electric power system, selecting an energy storage sub-module with a largest SOC and a quantity equal to the variation among all the energy storage sub-modules that are not selected as the charging energy storage sub-modules as a new charging energy storage sub-module.

Optionally, the selecting, based on the SOC information and the variation of the energy storage sub-module, the energy storage sub-module as a charging energy storage sub-module by using a SOC sequencing and balancing policy includes: under a condition that the variation is less than 0 and the electric power system outputs electrical energy to the main energy transmission circuit, selecting an energy storage sub-module with a largest SOC and a quantity equal to an absolute value of the variation among all the charging energy storage sub-modules as a to-be-excised energy storage sub-module; or under a condition that the variation is less than 0 and the main energy transmission circuit outputs electrical energy to the electric power system, selecting an energy storage sub-module with a smallest SOC and a quantity equal to an absolute value of the variation among all the charging energy storage sub-modules as a to-be-excised energy storage sub-module.

Optionally, the determining a corresponding participation quantity of energy storage sub-modules participating in charging includes: performing PI control processing based on a reference voltage and a real-time voltage of the main energy transmission circuit to determine the participation quantity.

Optionally, the energy storage unit includes: a battery pack. The battery pack is connected in series with a pre-charge circuit capable of being connected or disconnected, to form an energy storage circuit. The energy storage circuit is connected in parallel with an output end of a corresponding rectifying circuit. The pre-charge circuit includes a first circuit capable of being connected or disconnected and a second circuit capable of being connected or disconnected, where the first circuit and the second circuit are connected in parallel, and the first circuit is provided with a start resistor. The method includes: under a condition that the energy storage unit pre-charges the corresponding voltage-sharing capacitor, controlling the first circuit to be connected and controlling the second circuit to be disconnected to use the start resistor for limiting current; and under a condition that the voltage-sharing capacitor of the energy storage sub-module meets the voltage-sharing capacitor pre-charge completion condition and the charging energy storage sub-module is charged, controlling the second circuit to be connected to implement short-circuiting for the start resistor.

Optionally, the voltage-sharing capacitor pre-charge completion condition includes: a difference between the voltage of the voltage-sharing capacitor and the voltage of the corresponding energy storage unit is less than a voltage difference threshold.

A second aspect of this disclosure provides an energy storage control unit, where the energy storage apparatus includes a plurality of energy storage sub-modules. The energy storage sub-module includes a power unit and an energy storage unit. The power unit includes a rectifying circuit and a voltage-sharing capacitor. The energy storage unit and the voltage-sharing capacitor are respectively connected in parallel with an output end of the rectifying circuit. In addition, the energy storage unit is capable of being connected to or disconnected from the output end of the rectifying circuit. Input ends of all the rectifying circuits are connected in series to form a main energy transmission circuit. The main energy transmission circuit is capable of being connected to or disconnected from a direct-current bus of an electric power system. The energy storage control unit includes: a voltage-sharing capacitor pre-charge module configured to, in a state in which the main energy transmission circuit is disconnected from the direct-current bus, sequentially control the energy storage units of the energy storage sub-modules to be connected to corresponding voltage-sharing capacitors, so as to make the energy storage units pre-charge the corresponding voltage-sharing capacitors; and a circuit connection control module configured to control the main energy transmission circuit to be connected to the direct-current bus under a condition that the voltage-sharing capacitor of each energy storage sub-module meets a voltage-sharing capacitor pre-charge completion condition.

Optionally, the energy storage control unit includes: a charge control module configured to, under a condition that the main energy transmission circuit is connected to the direct-current bus, control the energy storage units of the energy storage sub-modules to be connected to the corresponding rectifying circuits according to a control policy to implement a charging treatment.

A third aspect of this disclosure provides an energy storage control unit, including: a memory, and a processor coupled to the memory. The processor is configured to execute the method provided in the first aspect of this disclosure based on an instruction stored in the memory.

A fourth aspect of this disclosure provides a power transmission system including an energy storage apparatus and the energy storage control unit provided in the third aspect of this disclosure.

Optionally, a connection circuit between the energy storage unit and the output end of the rectifying circuit is provided with a pre-charge circuit capable of being connected or disconnected.

Optionally, the energy storage unit includes: a battery pack. The battery pack is connected in series with the pre-charge circuit to form an energy storage circuit. The energy storage circuit is connected in parallel with an output end of a corresponding rectifying circuit.

Optionally, the pre-charge circuit includes a first circuit capable of being connected or disconnected and a second circuit capable of being connected or disconnected; where the first circuit and the second circuit are connected in parallel; the first circuit is provided with a first start resistor and a first switch that are connected in series; and the second circuit is provided with a second switch.

Optionally, an energy storage module sub-nut includes: a control sub-unit, where the control sub-unit is connected to the corresponding power unit and pre-charge circuit, and is connected to the energy storage control unit. The control sub-unit is configured to control a state of the power unit and control the connection and disconnection of the pre-charge circuit after receiving a control instruction sent by the energy storage control unit.

Optionally, the control sub-unit is further configured to obtain a voltage of the voltage-sharing capacitor as well as a voltage and SOC information of the battery pack, and send them to the energy storage control unit.

Optionally, the voltage transducer is configured to acquire a real-time voltage of the main energy transmission circuit and send the real-time voltage to the energy storage control unit.

A fifth aspect of this disclosure provides a computer-readable storage medium. The computer-readable storage medium stores a computer instruction, and the instruction is executed by a processor to implement the grid connection control method of the energy storage apparatus provided in the first aspect of this disclosure.

DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts.

DESCRIPTION OF EMBODIMENTS

Figure 1A:
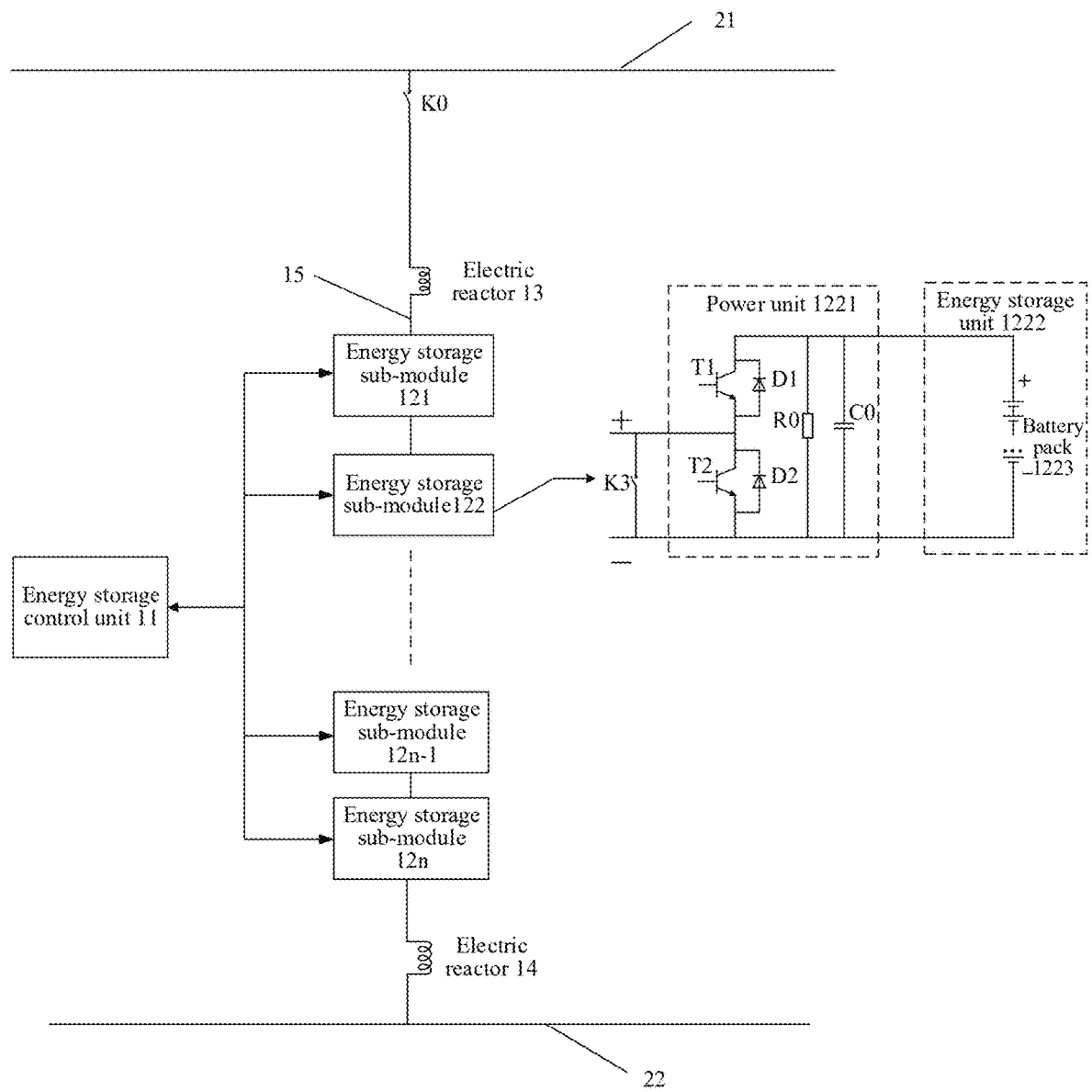
FIG. 1A is a schematic structural diagram of an energy storage system.

The following further describes implementations of this application in detail with reference to the accompanying drawings and embodiments. The detailed description of the embodiments and the accompanying drawings are intended to illustrate the principle of this application, rather than to limit the scope of this application, meaning this application is not limited to the embodiments described herein.

In the description of the embodiments of this application, the term "a plurality of" means more than two (inclusive). Similarly, "a plurality of groups" means more than two (inclusive) groups, and "a plurality of pieces" means more than two (inclusive) pieces.

This application uses the descriptions of the orientations or positional relationships indicated by "upper", "lower", "top", "bottom", "front", "rear", "inside", "outside", and the like, which are merely for ease of description of this application rather than for indicating or implying that the apparatus mentioned must have specific orientations or must be constructed or manipulated according to specific orientations. Therefore, these terms shall not be construed as any limitation on the protection scope of this application.

In addition, the terms "first", "second", "third", and the like are merely for the purpose of description and shall not be understood as any indication or implication of relative importance. "Perpendicular" is not strictly perpendicular, but within the allowable range of error. "Parallel" is not strictly parallel, but within the allowable range of error. The orientation terms appearing in the following description all are directions shown in the figures, and do not limit the specific structure of the application.

In the description of this application, it should also be noted that unless otherwise specified and defined explicitly, the terms "mounting", "connection", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

This disclosure provides a technical solution for grid connection of an energy storage apparatus. In a state in which a main energy transmission circuit is disconnected from a direct-current bus, energy storage units of energy storage sub-modules are sequentially controlled to pre-charge corresponding voltage-sharing capacitors; and under a condition that the voltage-sharing capacitor of each energy storage sub-module meets a voltage-sharing capacitor pre-charge completion condition, the main energy transmission circuit is controlled to be connected to the direct-current bus and the energy storage sub-module is controlled to be charged according to a control policy, thereby reducing an instantaneous impulse current and an instantaneous impulse voltage generated in a grid connection process, prolonging the service life of the energy storage apparatus, improving the use safety of the energy storage apparatus, and also reducing damage to an accessed power grid and other devices in the power grid, thereby achieving a more stable charge process, ensuring a smooth grid connection, and improving the grid connection reliability and safety of the energy storage apparatus.

In a related technology known by the inventors, as shown in FIG. 1A, an energy storage system includes an energy storage control unit 11 and an energy storage apparatus. The energy storage apparatus adopts a modular multi-level cascade structure, including an energy storage sub-module 121, an energy storage sub-module 122, . . . , and an energy storage sub-module 12n that are connected in series. The electric power system may be various electric power systems. For example, the electric power system may be a flexible direct-current power transmission system or the like.

The electric power system includes a direct-current bus and the like. The direct-current bus includes a positive electrode direct-current bus 21 and a negative electrode direct-current bus 22. Two ends of the energy storage apparatus are respectively connected to the positive electrode direct-current bus 21 and the negative electrode direct-current bus 22. The two ends of the energy storage apparatus may alternatively be respectively connected to the positive electrode direct-current bus 21 and a neutral metal loop wire. A switch K0 is provided on a connection line between one end of the energy storage apparatus and the positive electrode direct-current bus 21, which may be various switches. During charging of the energy storage apparatus, the energy storage control unit 11 controls K0 to be connected, and electrical energy of the electric power system is inputted to the energy storage apparatus through the direct-current bus so as to charge the energy storage apparatus.

An electric reactor may be provided at one end or two ends of the energy storage apparatus. For example, the two ends of the energy storage apparatus are respectively connected to the positive electrode direct-current bus 21 and the negative electrode direct-current bus 22 through electric reactors 13 and 14, thereby reducing an instantaneous impulse current generated during grid connection switching of the energy storage apparatus. The energy storage sub-module includes a power unit 1221 and an energy storage unit 1222. The energy storage unit 1222 may be connected to the power unit 1221 through a bus or the like. The energy storage unit 1222 transmits electrical energy and implements charging through the power unit 1221. The energy storage unit 1222 includes a battery pack 1223, and the battery pack 1223 may be a lithium battery pack or the like.

The power unit 1221 may adopt various circuit structures. For example, the power unit 1221 includes a switch K3, rectifying circuits, a voltage-sharing capacitor C0, a voltage-sharing resistor R0, and the like. K3 is a bypass switch, and may be various switch apparatuses. The energy storage unit 1222, the voltage-sharing capacitor C0, and the voltage-sharing resistor R0 are all connected in parallel with output ends of the rectifying circuits. Input ends of all the rectifying circuits are connected in series to form a main energy transmission circuit 15 which is connected to the direct-current bus of the electric power system.

The rectifying circuit may be a half-bridge, full-bridge, or quasi-full-bridge rectifying circuit. As shown in FIG. 1A, the power unit 1221 includes a half-bridge rectifying circuit formed by transistors T1 and T2 and diodes D1 and D2. As shown in FIG. 1C, the power unit 1221 includes a full-bridge rectifying circuit formed by transistors T1, T2, T3, and T4 and diodes D1, D2, D3, and D4.

Figure 1B:
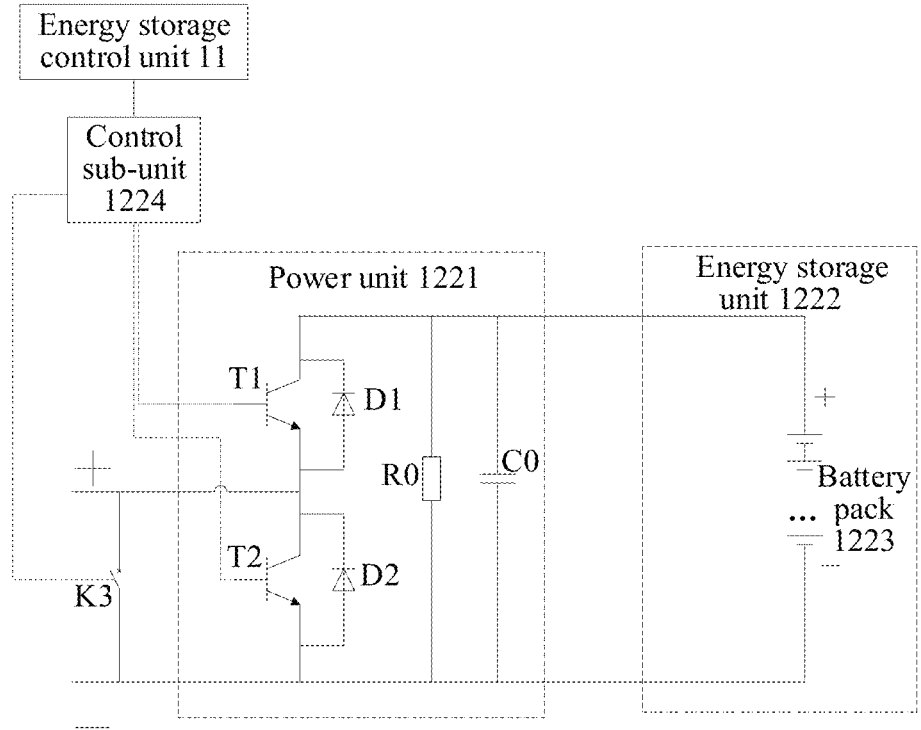
FIG. 1B is a schematic diagram of a connection between a control sub-unit in an energy storage sub-module and another unit.
Figure 1C:
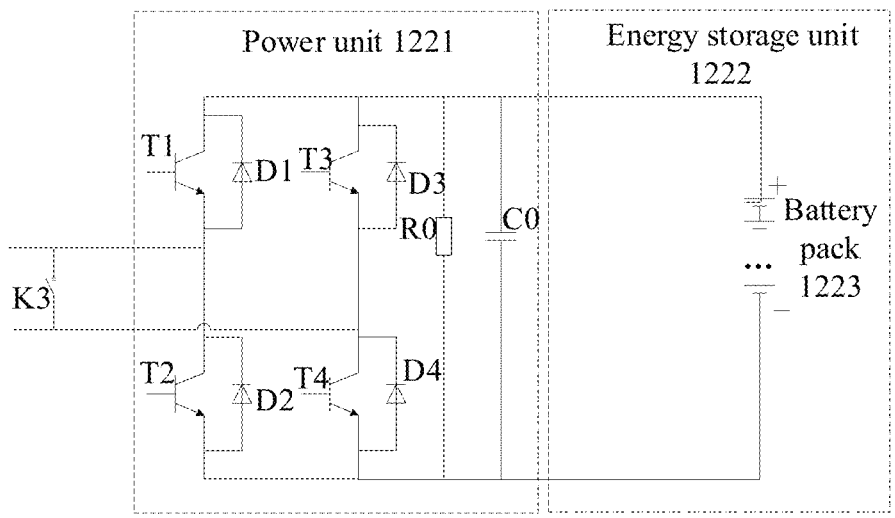
FIG. 1C is another schematic structural diagram of a power unit in an energy storage sub-module.

As shown in FIG. 1B, each energy storage sub-module is provided with a control sub-unit 1224, and each control sub-unit 1224 is connected to the energy storage control unit 11. The control sub-unit 1224 receives a control instruction sent by the energy storage control unit 11 and executes a corresponding function based on the control instruction. When the direct-current bus is electrified, the energy storage control unit 11 controls K0 to be connected and sends a charge control instruction to the control sub-unit 1224, and the control sub-unit 1224 controls the bypass switch K3 to be disconnected and controls the rectifying circuit to be in a connected state based on the charge control instruction.

While the energy storage apparatus is connected to the direct-current bus for grid connection, instantaneous impulse current and impulse voltage are generated. Excessively large instantaneous impulse current and impulse voltage cause significant damage to the energy storage apparatus, short the service life of the energy storage apparatus, affect the use safety of the energy storage apparatus, and may cause damage to an accessed power grid and other devices in the power grid during grid connection of the energy storage apparatus. The main energy transmission circuit 15 may be provided with a current or voltage acquisition apparatus. The current or voltage acquisition apparatus sends acquired voltage or current information to the energy storage control unit 11. If the instantaneous impulse current and impulse voltage generated in the grid connection process are excessively large, the energy storage control unit 11 determines that the energy storage apparatus needs to be protected, and controls the switch K0 to be disconnected, causing failure of grid connection of the energy storage apparatus and affecting the stability of the grid connection.

Figure 2:
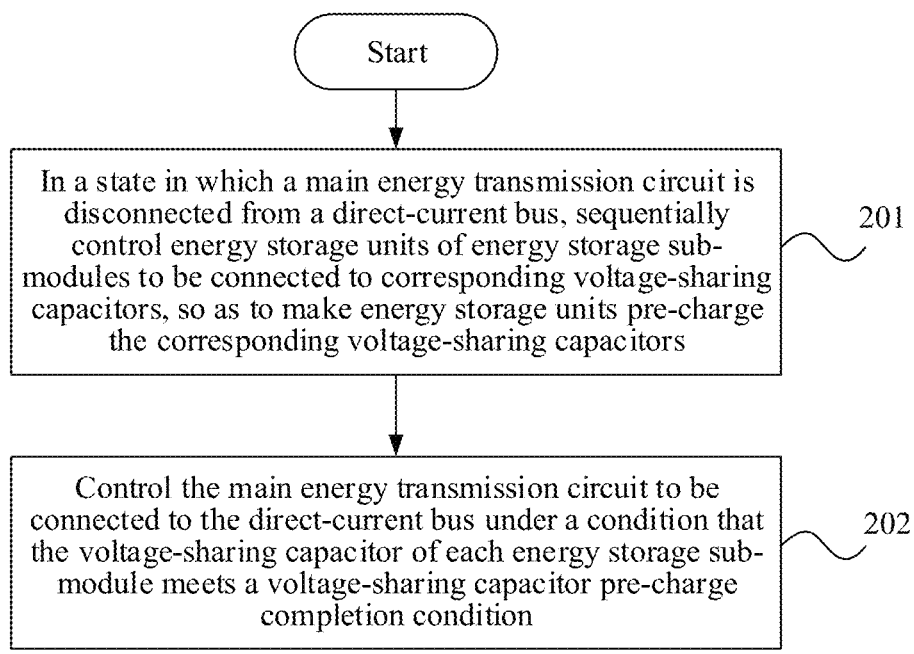
FIG. 2 is schematic flowchart of a grid connection control method of an energy storage apparatus according to some embodiments of this disclosure.

FIG. 2 is a schematic flowchart of a grid connection control method of an energy storage apparatus according to some embodiments of this disclosure, with the following steps as shown in FIG. 2.

Step 201. In a state in which the main energy transmission circuit is disconnected from the direct-current bus, the energy storage units of the energy storage sub-modules are sequentially controlled to be connected to the corresponding voltage-sharing capacitors, so as to make the energy storage units pre-charge the corresponding voltage-sharing capacitors.

Step 202. The main energy transmission circuit is controlled to be connected to the direct-current bus under a condition that the voltage-sharing capacitor of each energy storage sub-module meets the voltage-sharing capacitor pre-charge completion condition.

When grid connection is started, the main energy transmission circuit is controlled to be disconnected from the electric power system, and the energy storage unit is controlled to be connected to the corresponding voltage-sharing capacitor so as to pre-charge the voltage-sharing capacitor, thereby reducing a difference between a voltage of the main energy transmission circuit and a voltage of the direct-current bus, reducing damage to the energy storage apparatus caused by an instantaneous impulse current and an instantaneous impulse voltage generated in a grid connection process, prolonging the service life of the energy storage apparatus, improving the use safety of the energy storage apparatus, also reducing damage to an accessed power grid and other devices in the power grid, ensuring a smooth grid connection, and improving the grid connection reliability and safety of the energy storage apparatus.

In some embodiments, under a condition that the main energy transmission circuit is connected to the direct-current bus, the energy storage units of the energy storage sub-modules are controlled to be connected to the corresponding rectifying circuits according to a control policy to implement a charging treatment. After the voltage-sharing capacitor is pre-charged, the power grid is controlled to charge the energy storage sub-module according to the control policy, thereby achieving a more stable charge process, reducing damage to the power grid and other devices in the power grid, ensuring a smooth grid connection, and improving the grid connection reliability and safety of the energy storage apparatus.

The control policy may be various control policies. In addition to the control policy in the embodiments of this disclosure, various other control policies may also be adopted. For example, the controlling the energy storage unit of the energy storage sub-module to implement a charging treatment according to the control policy includes: selecting an energy storage sub-module as a charging energy storage sub-module based on SOC information of the energy storage sub-module, and controlling the charging energy storage sub-module to be charged under a condition that the main energy transmission circuit is connected to the direct-current bus, so that the electric power system charges the charging energy storage sub-module. The SOC (State of Charge) information of the energy storage sub-module is SOC information of the energy storage unit 1222 of the energy storage sub-module, that is, SOC information of the battery pack 1223 in the energy storage unit 1222.

After the voltage-sharing capacitor is pre-charged, an energy storage sub-module is selected for charging based on the SOC information of the energy storage sub-modules, thereby achieving a more stable charge process, ensuring a smooth grid connection, and improving the grid connection reliability and safety of the energy storage apparatus.

In some embodiments, a connection circuit between the energy storage unit 1222 and the output end of the rectifying circuit is provided with a switch circuit, so that the energy storage unit 1222 can be connected to or disconnected from the rectifying circuit. The connection and disconnection between the energy storage unit 1222 and the output end of the rectifying circuit can be implemented by controlling the switch circuit. The switch circuit may be various switch circuits. For example, the switch circuit includes a pre-charge circuit or the like.

Figure 3A:
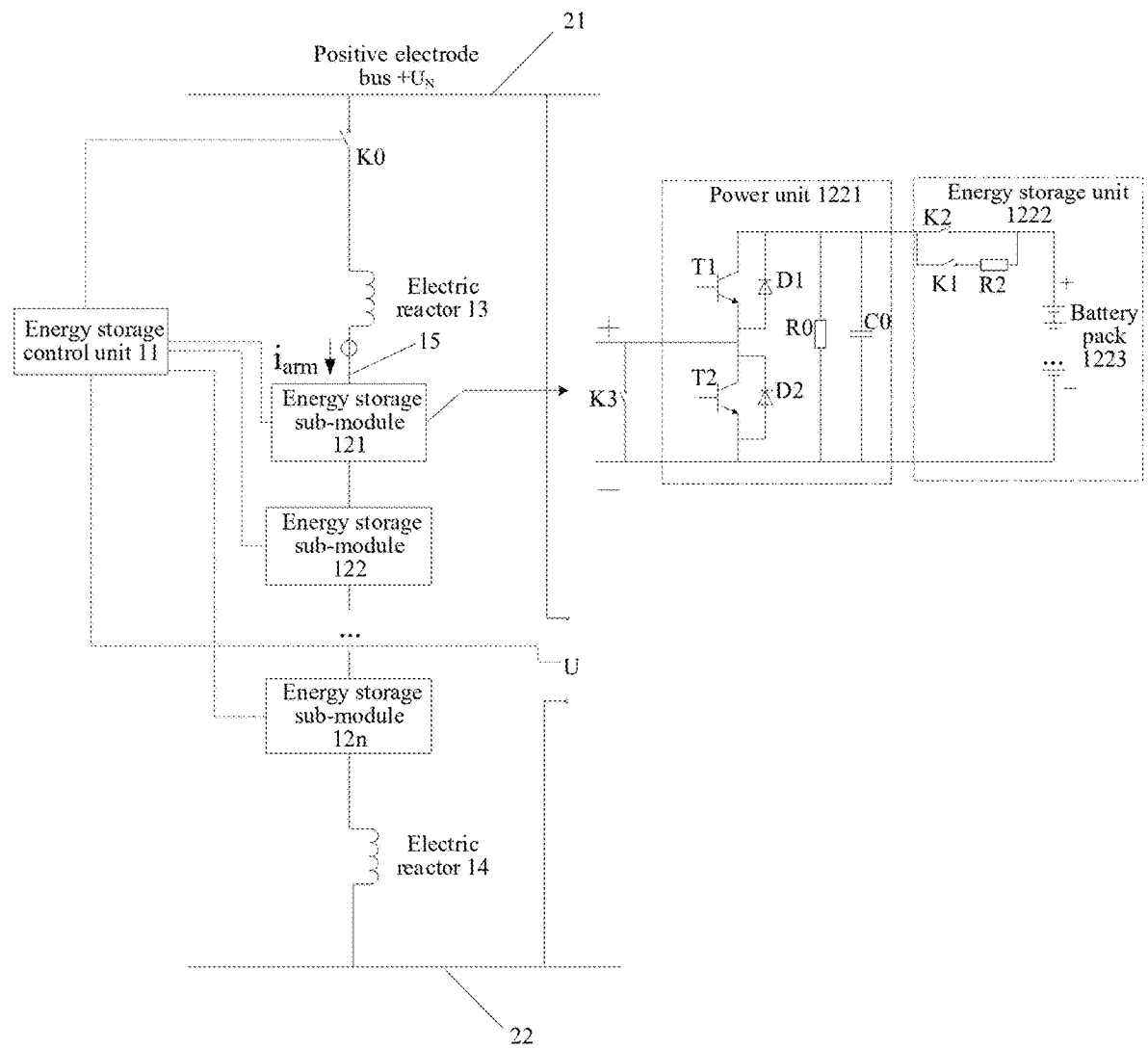
FIG. 3A is a schematic structural diagram of an energy storage system according to some embodiments of this disclosure.
Figure 3B:
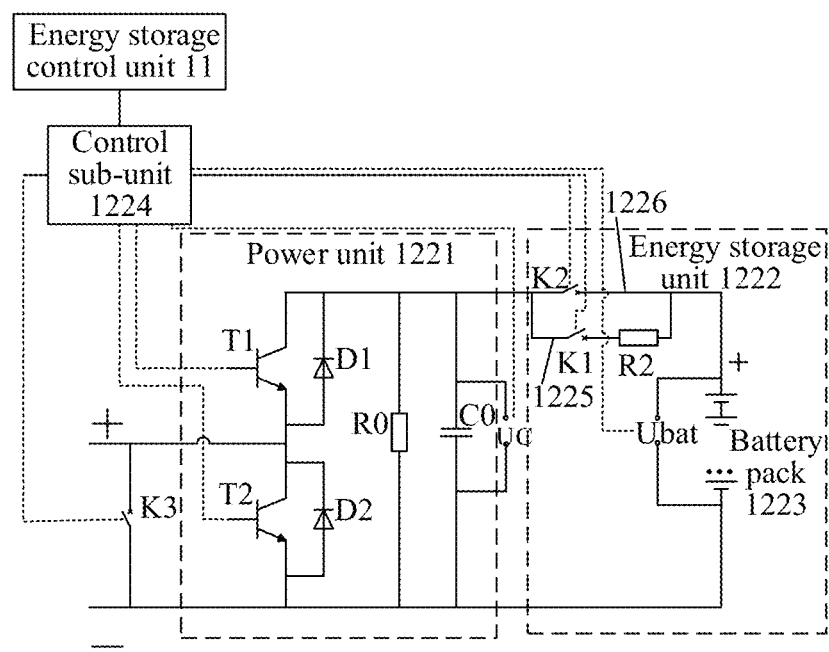
FIG. 3B is a schematic diagram of a connection between a control sub-unit in an energy storage sub-module of an energy storage system and another unit in this disclosure.

The energy storage unit 1222 may adopt various circuit structures. For example, as shown in FIG. 3A and FIG. 3B, the energy storage unit 1222 includes an energy storage circuit formed by a battery pack 1223 and a pre-charge circuit connected in series, where the battery pack 1223 stores electrical energy. One or more pre-charge circuits may be provided, which may be disposed at one side or two sides of the battery pack 1223. The pre-charge circuit may adopt various structures. For example, the pre-charge circuit includes a first circuit 1225 and a second circuit 1226 connected in parallel. The first circuit 1225 is provided with a start resistor R2 and a first switch apparatus K1 connected in series, and the second circuit 1226 is provided with a second switch apparatus K2.

Under a condition that the energy storage unit pre-charges the corresponding voltage-sharing capacitor, the first circuit 1225 is controlled to be connected and the second circuit 1226 is controlled to be disconnected, so that the start resistor R1 is used to limit current. The start resistor R2 is used to limit current, so that a peak current during charging can be limited, thereby protecting the battery pack 1223. Implementing short-circuiting for the start resistor R2 can reduce the electrical energy consumed for starting the start resistor R2.

As shown in FIG. 3B, a voltage transducer can be provided to acquire a total voltage U of the energy storage apparatus, that is, the voltage of the main energy transmission circuit. The energy storage control unit 11 obtains the total voltage U acquired by this voltage transducer. A current transducer can be provided to acquire a real-time current (bridge arm current) $I_{arm}$ in the main energy transmission circuit. The energy storage control unit 11 obtains the $I_{arm}$ acquired by this current transducer. As shown in FIG. 3B, a voltage transducer can be provided to respectively acquire a capacitor voltage $U_c$ of the voltage-sharing capacitor C0 and a battery voltage $U_{bat}$ of the battery pack 1223 and obtain the SOC information of the battery pack 1223; and the control sub-unit 1224 obtains the $U_c$ and $U_{bat}$ acquired by the voltage transducer and sends the $U_c$, $U_{bat}$, and SOC information to the energy storage control unit 11. The grid connection control method of the energy storage apparatus of this disclosure is applied to the energy storage control unit 11. The energy storage control unit 11 controls K0 to be in a connected or disconnected state. The control sub-unit 1224 controls the power unit 1221 to be in a connected or disconnected state and controls K3, K2, and K1 to be in a connected or disconnected according to the control instruction sent by the energy storage control unit 11.

The control sub-unit 1224 may have various implementation manners. For example, the control sub-unit 1224 includes one or more processors and memories. The memory may be a volatile memory and/or a non-volatile memory for storing one or more computer program instructions. The processor can run the program instruction to communicate with the energy storage control unit and implement other functions that need to be processed by itself. The control sub-unit 1224 may be integrated or divided into two sub-units for deployment. For example, the control sub-unit 1224 includes a power control sub-unit and a battery control sub-unit. The power control sub-unit controls a state of the power unit and the like after receiving a control instruction sent by the energy storage control unit. The battery control sub-unit controls connection and disconnection of the pre-charge circuit and the like after receiving the control instruction sent by the energy storage control unit. The power control sub-unit obtains a voltage of the voltage-sharing capacitor and sends the voltage to the energy storage control unit. The battery control sub-unit obtains a voltage and SOC information of the battery pack and sends the voltage and SOC information to the energy storage control unit.

The voltage-sharing capacitor pre-charge completion condition may be various conditions. For example, the voltage-sharing capacitor pre-charge completion condition includes: a difference between the voltage of the voltage-sharing capacitor and the voltage of the corresponding energy storage unit is less than a voltage difference threshold. As shown in FIG. 3A and FIG. 3B, when grid connection is started, the energy storage control unit 11 controls K0 to be disconnected, so that the main energy transmission circuit 15 is disconnected from a positive electrode direct-current bus 21; the energy storage control unit 11 sends a control instruction; the control sub-unit 1224 connects K1 and disconnects K2 according to the control instruction, so that the energy storage unit 1222 is connected to the corresponding voltage-sharing capacitor C0; R1 is used to limit current; and the energy storage unit 1222 pre-charges the corresponding voltage-sharing capacitor C0, that is, the battery pack 1223 is used to pre-charge the voltage-sharing capacitor C0. During pre-charging of the voltage-sharing capacitor C0, the control sub-unit 1224 can control K3 to be connected.

The control sub-unit 1224 obtains a voltage $U_c$ of the voltage-sharing capacitor C0 and a voltage $U_{bat}$ of the battery pack 1223 in real time and sends them to the energy storage control unit 11, where $U_{bat}$ is a voltage of the energy storage unit 1222. When |Voltage $U_c$ of voltage-sharing capacitor C0-voltage of storage energy storage unit 1222 (voltage of battery pack 1223) $|U_{bat}|\leq \Delta U1$, it is determined that the voltage-sharing capacitor of the energy storage sub-module meets the voltage-sharing capacitor pre-charge completion condition, where $\Delta U1$ is a voltage difference threshold, which is predetermined based on internal resistance and allowable charge current of the battery. When it is determined that the voltage-sharing capacitor of the energy storage sub-module meets the voltage-sharing capacitor pre-charge completion condition, the energy storage control unit 11 sends a control instruction, and the control sub-unit 1224 connects K2 according to the control instruction to implement short-circuiting for R2. After K2 is connected, the control sub-unit 1224 can disconnect K1.

The voltage-sharing capacitors of the energy storage sub-modules are sequentially pre-charged. Under a condition that the voltage-sharing capacitor of each energy storage sub-module meets the voltage-sharing capacitor pre-charge completion condition, that is, under a condition that K2 of each energy storage sub-module is connected, an energy storage sub-module is selected as a charging energy storage sub-module based on the SOC information of the energy storage sub-module, and a position of the charging energy storage sub-module is determined.

Figure 4:
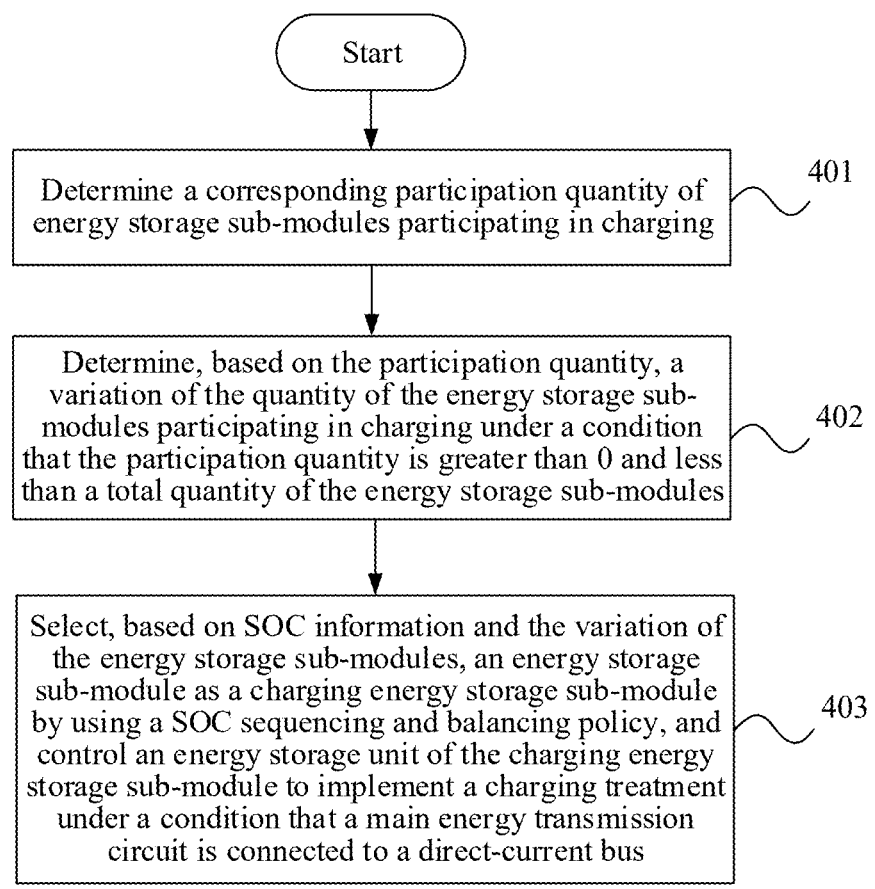
FIG. 4 is schematic flowchart of implementing charging based on SOC information of an energy storage sub-module in a grid connection control method of an energy storage apparatus according to some embodiments of this disclosure.

Various methods can be used for controlling the charging treatment of the energy storage sub-module based on the SOC information of the energy storage unit. FIG. 4 is a schematic flowchart of implementing charging based on SOC information of an energy storage sub-module in a grid connection control method of an energy storage apparatus according to some embodiments of this disclosure, with the following steps as shown in FIG. 4.

Step 401. Determine a corresponding participation quantity of energy storage sub-modules participating in charging.

Step 402. Determine, based on the participation quantity, a variation of the quantity of the energy storage sub-modules participating in charging under a condition that the participation quantity is greater than 0 and less than a total quantity of the energy storage sub-modules.

Step 403. Select, based on the SOC information and variation of the energy storage sub-modules, an energy storage sub-module as a charging energy storage sub-module by using a SOC sequencing and balancing policy, and control an energy storage unit of the charging energy storage sub-module to implement a charging treatment under a condition that a main energy transmission circuit is connected to a direct-current bus.

The energy storage sub-module is selected as a charging energy storage sub-module for charging by using the SOC sequencing and balancing policy, so that the stability of a voltage of the direct-current bus and a voltage of the main energy transmission circuit can be maintained, and the energy storage sub-modules are adjusted to have the same SOC, thereby achieving a more stable charge process, and improving the grid connection reliability and the charging stability of the energy storage apparatus.

Figure 5:
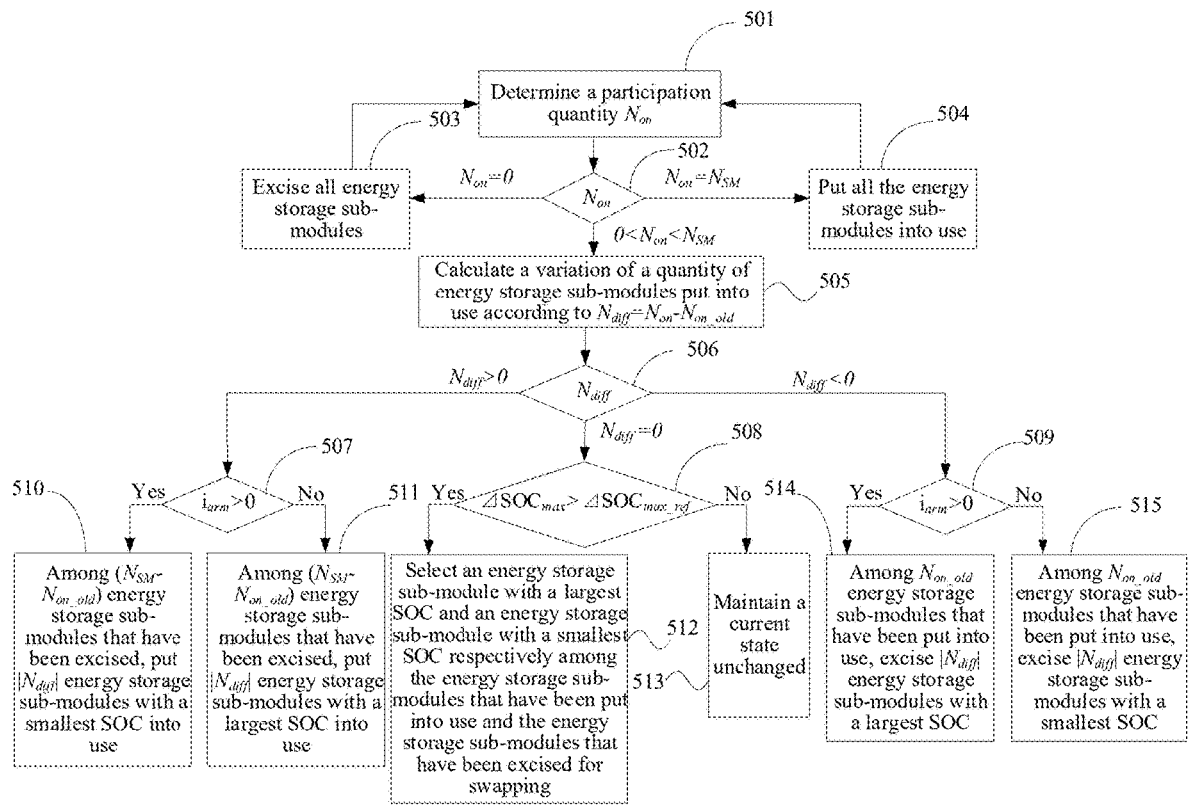
FIG. 5 is schematic flowchart of implementing charging control according to a SOC sequencing and balancing policy in a grid connection control method of an energy storage apparatus according to some embodiments of this disclosure.

In an embodiment, various methods can be used for controlling the charging of the energy storage unit of the energy storage sub-module by using the SOC sequencing and balancing policy. FIG. 5 is a schematic flowchart of implementing charging control according to a SOC sequencing and balancing policy in a grid connection control method of an energy storage apparatus according to some embodiments of this disclosure, with the following steps as shown in FIG. 5.

Step 501. Determine a participation quantity $N_{on}$.

Step 502. If $N_{on}=0$, perform step 503; if $N_{on}=N_{SM}$, perform step 504; and if $0<N_{on}<N_{SM}$, perform step 505. $N_{SM}$ is a total quantity of the energy storage sub-modules.

Step 503. Excise all the energy storage sub-modules. For example, when one energy storage sub-module is excised, the energy storage control unit 11 sends a control instruction to a corresponding control sub-unit 1224; and the control sub-unit 1224 controls K1, K2, and K3 to be all in a disconnected state or controls K3 and K2 to be in a connected state and K1 to be in a disconnected state based on the control instruction.

Step 504. Put all the energy storage sub-modules into use. For example, when one energy storage sub-module is put into use, the energy storage control unit 11 sends a control instruction to a corresponding control sub-unit 1224; and the control sub-unit 1224 controls K2 to be in a connected state and controls K1 and K3 to be in a disconnected state based on the control instruction.

Step 505. Calculate a variation of a quantity of energy storage sub-modules put into use according to $N_{diff}=N_{on}-N_{on\_old}$. To be specific, under a condition that the participation quantity $N_{on}$ is less than the total quantity of the energy storage sub-modules $N_{SM}$, determine the variation $N_{diff}$ of the quantity of the energy storage sub-modules as $N_{on}-N_{on\_old}$ based on the participation quantity $N_{on}$, where $N_{on\_old}$ is a participation quantity determined previously, and when the participation quantity is calculated for the first time, $N_{on\_old}$ is a default value of 0.

Step 506. If $N_{diff}>0$, perform step 507; if $N_{diff}=0$, perform step 508; and if $N_{diff}<0$, perform step 509.

Step 507. Determine whether $i_{arm}$ is greater than 0; if $i_{arm}>0$, perform step 510; and if $i_{arm}<0$ or $i_{arm}=0$, perform step 511. If $i_{arm}>0$, a current direction in the main energy transmission circuit is determined as a direction in which the current flows into the energy storage apparatus, and the energy storage apparatus is in a charging state. If $i_{arm}<0$ or $i_{arm}=0$, the current direction in the main energy transmission circuit is determined as a direction in which the current flows towards the direct-current bus, and the energy storage apparatus is in a discharging state, where if $i_{arm}=0$, it means that the currently charged pre-charge energy storage sub-module is nearly fully charged, and such situation means that the current direction in the main energy transmission circuit is a direction in which the current flows towards the direct-current bus.

Step 510. Among ($N_{SM}-N_{on\_old}$) energy storage sub-modules that have been excised, put $|N_{diff}|$ energy storage sub-modules with a smallest SOC into use.

Step 511. Among the ($N_{SM}-N_{on\_old}$) energy storage sub-modules that have been excised, put $|N_{diff}|$ energy storage sub-modules with a largest SOC into use.

In an embodiment, the SOC of the energy storage sub-module is a SOC value of a battery pack in the energy storage sub-module. Under a condition that the variation $N_{diff}$ is greater than 0 and the electric power system outputs electrical energy to the main energy transmission circuit, an energy storage sub-module with a smallest SOC and a quantity equal to the variation $N_{diff}$ among all the energy storage sub-modules that are not selected as the charging energy storage sub-modules is selected as a new charging energy storage sub-module, and an energy storage unit of the new charging energy storage sub-module is controlled to be connected to a corresponding rectifying circuit for charging. Under a condition that the variation $N_{diff}$ is greater than 0 and the main energy transmission circuit outputs electrical energy to the electric power system, an energy storage sub-module with a largest SOC and a quantity equal to the variation $N_{diff}$ among all the energy storage sub-modules that are not selected as the charging energy storage sub-modules is selected as a new charging energy storage sub-module, and an energy storage unit of the new charging energy storage sub-module is controlled to be connected to a corresponding rectifying circuit for charging.

Based on the variation of the quantity of the energy storage sub-modules participating in charging and a battery SOC sequence, the energy storage sub-module can be selected and controlled for charging under a condition that the variation is greater than 0, so that the stability of a voltage of the direct-current bus and a voltage of the main energy transmission circuit can be maintained, and the energy storage sub-modules are adjusted to have the same SOC, thereby achieving a more stable charge process, and improving the grid connection reliability of the energy storage unit.

Step 508. If $\Delta SOC_{max}>\Delta SOC_{max\_ref}$, perform step 512; and if $\Delta SOC_{max}<\Delta SOC_{max\_ref}$ or $\Delta SOC_{max}=\Delta SOC_{max\_ref}$, perform step 513. $\Delta SOC_{max}$ is a maximum real-time SOC deviation value of the energy storage sub-module, that is, a difference between a maximum SOC value and a minimum SOC value of all battery modules, which is a maximum SOC deviation; $\Delta SOC_{max}$ ref is an allowable maximum SOC deviation value, which is a SOC deviation threshold; and $\Delta\Delta SOC_{max}$ ref is determined according to system requirements.

Step 512. Select an energy storage sub-module with a largest SOC and an energy storage sub-module with a smallest SOC respectively among the energy storage sub-modules that have been put into use (connected) and the energy storage sub-modules that have been excised (disconnected) for swapping.

Step 513. Maintain a current state unchanged.

In some embodiments, if the variation is equal to 0 and the maximum SOC deviation $\Delta SOC_{max}$ is greater than the SOC deviation threshold $\Delta SOC_{max\_ref}$, an energy storage sub-module with a smallest SOC among all the energy storage sub-modules that are not selected as the charging energy storage sub-modules is selected as a new charging energy storage sub-module, and an energy storage unit of the new charging energy storage sub-module is controlled to be connected to a corresponding rectifying circuit. In addition, an energy storage sub-module with a largest SOC (this charging sub-module is used as a to-be-excised energy storage sub-module) among all the charging energy storage sub-modules, is selected, and an energy storage unit of this charging energy storage sub-module is controlled to be disconnected from the corresponding rectifying circuit, where the maximum SOC deviation is a difference between a maximum SOC and a minimum SOC of the energy storage sub-module.

Based on the variation of the quantity of the energy storage sub-modules participating in charging, the battery SOC sequence, and the SOC deviation, the energy storage sub-module can be selected and controlled for charging under a condition that the variation is equal to 0, so that the stability of the voltage of the direct-current bus and the voltage of the main energy transmission circuit can be maintained, and the energy storage sub-modules are adjusted to have the same SOC, thereby achieving a more stable charge process, and improving the grid connection reliability of the energy storage unit.

Step 509. Determine whether $i_{arm}$ is greater than 0; if $i_{arm}>0$, perform step 514; and if $i_{arm}<0$ or $i_{arm}=0$, perform step 515.

Step 514. Among the $N_{on\_old}$ energy storage sub-modules that have been put into use, excise $|N_{diff}|$ energy storage sub-modules with a largest SOC.

Step 515. Among the $N_{on\_old}$ energy storage sub-modules that have been put into use, excise $|N_{diff}|$ energy storage sub-modules with a smallest SOC.

In some embodiments, under a condition that the variation $N_{diff}$ is less than 0 and the electric power system outputs electrical energy to the main energy transmission circuit, an energy storage sub-module with a largest SOC and a quantity equal to an absolute value $|N_{diff}|$ of the variation among all the charging energy storage sub-modules is selected as a to-be-excised energy storage sub-module, and the to-be-excised energy storage sub-module is controlled to be disconnected from a corresponding rectifying circuit. Under a condition that the variation $N_{diff}$ is less than 0 and the main energy transmission circuit outputs electrical energy to the electric power system, an energy storage sub-module with a smallest SOC and a quantity equal to the absolute value $|N_{diff}|$ of the variation among all the charging energy storage sub-modules is selected as a to-be-excised energy storage sub-module, and the to-be-excised energy storage sub-module is controlled to be disconnected from a corresponding rectifying circuit.

Based on the variation of the quantity of the energy storage sub-modules participating in charging and the battery SOC sequence, the energy storage sub-module can be selected and controlled for charging under a condition that the variation is less than 0, so that the stability of the voltage of the direct-current bus and the voltage of the main energy transmission circuit can be maintained, and the energy storage sub-modules are adjusted to have the same SOC, thereby achieving a more stable charge process, and improving the grid connection reliability of the energy storage unit.

When an energy storage sub-module is selected as a charging energy storage sub-module for charging for the first time by using the SOC sequencing and balancing policy and based on the SOC information and variation of the energy storage sub-module, the energy storage control unit 11 controls K0 to be connected, so as to make the electric power system charge the charging energy storage sub-module. Subsequently, an energy storage sub-module continues to be selected as a charging energy storage sub-module for charging by using the SOC sequencing and balancing policy and based on the SOC information and variation of the energy storage sub-module. Whether the charging completion condition is met is determined. After the charging completion condition is met, it is determined that the grid connection and charging of the energy storage apparatus are completed. There may be various charging completion conditions. For example, the charging completion condition may be that an average SOC of all the energy storage sub-modules is greater than a SOC threshold; a time for the charging implemented using the SOC sequencing and balancing policy is greater than a time threshold; or the like.

In some embodiments, under a condition that the voltage-sharing capacitor of the energy storage sub-module meets the voltage-sharing capacitor pre-charge completion condition and the charging energy storage sub-module is charged, the second circuit 1226 is controlled to be connected, to implement short-circuiting for the start resistor R1. As shown in FIG. 3A and FIG. 3B, the energy storage control unit 11 sends a control instruction to a corresponding control sub-unit 1224; and the control sub-unit 1224 controls K2 to be in a connected state and implements short-circuiting for R2 based on the control instruction, or controls K1 to be in a disconnected state and excises R2.

In some embodiments, various methods can be used for determining the corresponding participation quantity of the energy storage sub-units participating in charging. For example, PI control processing is performed based on a reference voltage and a real-time voltage of the main energy transmission circuit 15 to determine the corresponding participation quantity of the energy storage sub-units participating in charging.

Figure 6:
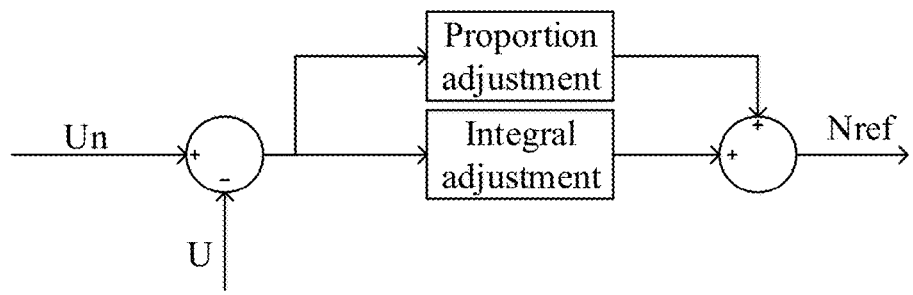
FIG. 6 is a schematic diagram of a control principle for determining a charge participation quantity based on PI control processing.

The PI control processing is performed using an existing PI algorithm. A deviation proportion and integration are linearly combined to form a control quantity based on a given value and an actual output value, so as to control a controlled object. As shown in FIG. 6, UN is the reference voltage, which may be an actually measured or preset voltage UN of an access point of a positive electrode direct-current bus and the energy storage apparatus; U is an actually measured voltage U of the energy storage apparatus; and the PI algorithm used for the PI control processing is:

$$Nref = kp\left(\text{err}(t) + \frac{1}{T}\int \text{err}(t)dt\right); \quad (1\text{-}1)$$

where $N_{ref}$ is a quantity of energy storage sub-units that should be put into use, that is, the participation quantity of the energy storage sub-modules participating in charging; kp is a proportion adjustment parameter; T is an integral adjustment parameter; and err(t) is a difference between the voltage U of the energy storage apparatus and the reference voltage $U_N$; and the participation quantity is corrected based on the PI control processing until I is the same as $I_{ref}$ or the difference between U and $U_N$ is less than a preset voltage difference threshold. During calculation of the participation quantity, parameter values of kp, T, and $I_{ref}$ may be the same or may be adjusted accordingly.

PI control processing is performed based on a reference current and a real-time current in the main energy transmission circuit to determine a quantity of energy storage sub-units participating in pre-charging and charging. This can improve the accuracy of controlling the voltage of the main energy transmission circuit, achieving stable electrical energy for charging the energy storage sub-units, thereby improving the stability of the charge process.

Figure 7:
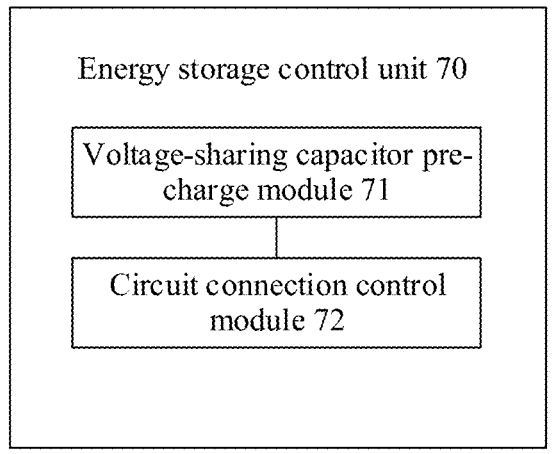
FIG. 7 is a schematic diagram of a first module of an energy storage control unit according to some embodiments of this disclosure.

In some embodiments, as shown in FIG. 7, this disclosure provides an energy storage control unit 70 including a voltage-sharing capacitor pre-charge module 71 and a circuit connection control module 72. The voltage-sharing capacitor pre-charge module 71 sequentially controls the energy storage units of the energy storage sub-modules to be connected to the corresponding voltage-sharing capacitors in a state in which the main energy transmission circuit is disconnected from the direct-current bus, so as to make the energy storage units pre-charge the corresponding voltage-sharing capacitors. The circuit connection control module 72 controls the main energy transmission circuit to be connected to the direct-current bus under a condition that the voltage-sharing capacitor of each energy storage sub-module meets the voltage-sharing capacitor pre-charge completion condition.

Figure 8:
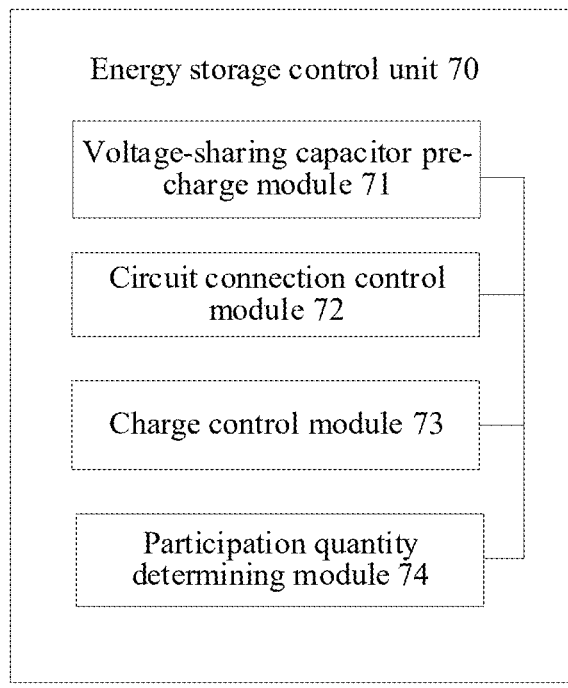
FIG. 8 is a schematic diagram of a second module of an energy storage control unit according to some embodiments of this disclosure.

As shown in FIG. 8, the energy storage control unit 70 further includes a charge control module 73. The charge control module 73 controls the energy storage units of the energy storage sub-modules to be connected to the corresponding rectifying circuits according to a control policy to implement a charging treatment under a condition that the main energy transmission circuit is connected to the direct-current bus.

In some embodiments, the charge control module 73 selects an energy storage sub-module as a charging energy storage sub-module based on SOC information of the energy storage sub-module and controls the charging energy storage sub-module to implement a charging treatment under a condition that the main energy transmission circuit is connected to the direct-current bus, so as to make the electric power system charge the charging energy storage sub-module.

The charge control module 73 determines the corresponding participation quantity of the energy storage sub-modules participating in charging. Under a condition that the participation quantity is greater than 0 and less than a total quantity of the energy storage sub-modules, a variation of the quantity of the energy storage sub-modules participating in charging is determined based on the participation quantity. The charge control module 73 selects an energy storage sub-module as a charging energy storage sub-module by using the SOC sequencing and balancing policy and based on the SOC information and variation of the energy storage sub-modules and controls an energy storage unit of the charging energy storage sub-module to implement a charging treatment under a condition that the main energy transmission circuit is connected to the direct-current bus.

Under a condition that the energy storage unit pre-charges the corresponding voltage-sharing capacitor, the voltage-sharing capacitor pre-charge module 71 uses the start resistor for limiting current. The charge control module 73 implements short-circuiting for the start resistor under a condition that the voltage-sharing capacitor of the energy storage sub-module meets the voltage-sharing capacitor pre-charge completion condition and the charging energy storage sub-module is charged.

In some embodiments, as shown in FIG. 8, the energy storage control unit 70 includes a participation quantity determining module 74, and the participation quantity determining module 74 performs PI control processing based on a reference voltage and a real-time voltage of the main energy transmission circuit to determine the participation quantity.

Figure 9:
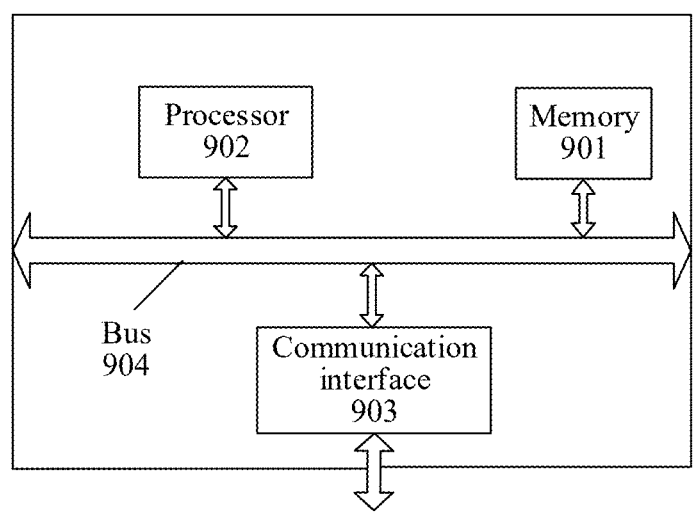
FIG. 9 is a schematic diagram of a third module of an energy storage control unit according to some embodiments of this disclosure.

FIG. 9 is a schematic diagram of a third module of an energy storage control unit according to some embodiments of this disclosure. As shown in FIG. 9, the energy storage control unit may include a memory 901, a processor 902, a communication interface 903, and a bus 904. The memory 901 is configured to store an instruction. The processor 902 is coupled to the memory 901. The processor 902 is configured to implement, according to the instruction stored in the memory 901, the grid connection control method of the energy storage apparatus according to any one of the foregoing embodiments.

The memory 901 may be a high-speed RAM memory, a non-volatile memory (non-volatile memory), or the like. Alternatively, the memory 901 may be a memory array. Alternatively, the memory 901 may be divided into blocks, and the blocks may be combined into a virtual volume according to a specific rule. The processor 902 may be a central processing unit CPU, or an application-specific integrated circuit ASIC (Application Specific Integrated Circuit), or one or more integrated circuits that are configured to implement the grid connection control method of the energy storage apparatus in this disclosure.

In some embodiments, this disclosure provides an energy storage system including the energy storage apparatus and the energy storage control unit in any one of the foregoing embodiments.

In an embodiment, this disclosure provides a computer-readable storage medium. The computer-readable storage medium stores a computer instruction, and the instruction is executed by a processor to implement the grid connection control method of the energy storage apparatus according to any one of the foregoing embodiments.

The computer-readable storage medium may be one readable medium or any combination of a plurality of readable media. The readable medium may be a readable signal medium or a readable storage medium. The readable storage medium, for example, may include but is not limited to an electrical, magnetic, optical, electromagnetic, infrared, or semiconductor system, device, or apparatus, or any combination thereof. More specific examples (a non-exhaustive list) of the readable storage medium may include: an electrical connector with one or more wires, a portable disk, a hard disk, a random access memory (RAM), a read-only memory (ROM), an erasable programmable read-only memory (EPROM or flash memory), optical fiber, a portable compact disk read-only memory (CD-ROM), an optical storage device, a magnetic storage device, or any suitable combination thereof.

This disclosure is described with reference to the flowcharts and/or block diagrams of the method, device (system), and computer program product according to the embodiments of this disclosure. It should be understood that computer program instructions may be used to implement each process and/or each block in the flowcharts and/or block diagrams and a combination of processes and/or blocks in the flowcharts and/or block diagrams. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can direct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The method and system in this disclosure may be implemented in various manners. For example, the method and system in this disclosure may be implemented by software, hardware, firmware, or any combination of software, hardware, and firmware. The foregoing sequence of the steps of the method is merely intended for illustration, and the steps of the method in this disclosure are not limited to the sequence in the foregoing specific description, unless otherwise specified. In addition, in some embodiments, this disclosure may alternatively be implemented as programs recorded in a recording medium, and these programs include machine-readable instructions for implementing the method according to this disclosure. Therefore, this disclosure also covers the recording medium that stores the programs for performing the method in this disclosure.

According to the disclosure, when grid connection is started, the main energy transmission circuit is controlled to be disconnected from the electric power system, and the energy storage unit is controlled to be connected to the corresponding voltage-sharing capacitor so as to pre-charge the voltage-sharing capacitor, thereby reducing a difference between a voltage of the main energy transmission circuit and a voltage of the direct-current bus, reducing damage to the energy storage apparatus caused by an instantaneous impulse current and an instantaneous impulse voltage generated in a grid connection process, prolonging the service life of the energy storage apparatus, improving the use safety of the energy storage apparatus, also reducing damage to an accessed power grid and other devices in the power grid, and improving the grid connection reliability and safety of the energy storage apparatus. These advantages apply to all grid connection control methods, energy storage apparatuses, energy storage control units, power transmission systems, and computer-readable storage media consistent with the disclosure.

Consistent with some embodiments of the disclosure, after the voltage-sharing capacitor is pre-charged, the energy storage sub-module is charged according to the control policy, thereby achieving a more stable charge process, reducing damage to a power grid and other devices in the power grid, ensuring a smooth grid connection, and improving the grid connection reliability and safety of the energy storage apparatus.

Consistent with some embodiments of the disclosure, an energy storage sub-module is selected as a charging energy storage sub-module based on the SOC information of the energy storage unit to implement a charging treatment, so that the stability of the voltage of the direct-current bus and the voltage of the main energy transmission circuit can be maintained, and the energy storage sub-modules are adjusted to have the same SOC, thereby achieving a more stable charge process, and improving the grid connection reliability and the charging stability and safety of the energy storage apparatus.

Consistent with some embodiments of the disclosure, the energy storage sub-module is selected as a charging energy storage sub-module by using the SOC sequencing and balancing policy for charging, so that the stability of the voltage of the direct-current bus and the voltage of the main energy transmission circuit can be maintained, and the energy storage sub-modules are adjusted to have the same SOC, thereby achieving a more stable charge process, and improving the grid connection reliability and the charging stability of the energy storage apparatus.

Based on the variation of the quantity of the energy storage sub-modules participating in charging, a battery SOC sequence, and the SOC deviation, the energy storage sub-module can be selected and controlled for charging under a condition that the variation is equal to 0, so that the stability of the voltage of the direct-current bus and the voltage of the main energy transmission circuit can be maintained, and the energy storage sub-modules are adjusted to have the same SOC, thereby achieving a more stable charge process, and improving the grid connection reliability of the energy storage unit.

Based on the variation of the quantity of the energy storage sub-modules participating in charging and the battery SOC sequence, the energy storage sub-module can be selected and controlled for charging under a condition that the variation is less than 0, so that the stability of the voltage of the direct-current bus and the voltage of the main energy transmission circuit can be maintained, and the energy storage sub-modules are adjusted to have the same SOC, thereby achieving a more stable charge process, and improving the grid connection reliability of the energy storage unit.

Consistent with some embodiments of the disclosure, performing PI control processing based on a reference current and a real-time current on the main energy transmission circuit to determine the quantity of the energy storage sub-modules participating in pre-charging and charging can improve the accuracy of controlling the voltage of the main energy transmission circuit and improve the stability of the charge process.

Consistent with some embodiments of the disclosure, the start resistor is used to limit current in a pre-charging stage, so that a peak current can be limited, an impulse current in the battery pack can be reduced, the safety of the battery pack can be improved, and the service life of the battery pack can be prolonged. In a charging stage, implementing short-circuiting for the start resistor can reduce the consumption of electrical energy.

Consistent with some embodiments of the disclosure, setting the voltage-sharing capacitor pre-charge completion condition can reduce damage to the energy storage apparatus caused by instantaneous impulse current and instantaneous impulse voltage generated in the grid connection process, thereby achieving a more stable charge process, and improving the grid connection reliability of the energy storage apparatus.

Consistent with some embodiments of the disclosure, the pre-charge circuit is provided to limit a peak current, reducing an impulse current in the battery pack, thereby improving the use safety of the battery pack.

Consistent with some embodiments of the disclosure, the energy storage unit adopts the battery pack as an energy source. Through the charging and discharging functions of the battery pack, stable electrical energy can be provided for a long time. The pre-charge circuit is used to limit the peak current of the battery pack so as to provide a protection function, reducing the impulse current in the battery pack, thereby improving the use safety of the battery pack and prolonging the service life of the battery pack.

Consistent with some embodiments of the disclosure, when the battery pack is in an initial charging/discharging stage, the pre-charge circuit provided can start the start resistor by turning on the first switch and implement short-circuiting for the start resistor by turning on the second switch after the battery pack works normally, so as to limit the peak current and reduce the impulse current in the battery pack, thereby improving the use safety of the battery pack.

Consistent with some embodiments of the disclosure, the control sub-unit controls the power unit and the pre-charge circuit to control the charging and discharging of the battery pack, improving the stability of charge current and discharge current of the battery pack and achieving the advantages such as good harmonic characteristics and low equivalent switching frequency, thereby effectively preventing overcharging and over-discharging of the battery pack, achieving safer and more reliable charging and discharging of the battery pack, and prolonging the service life of the battery pack.

Consistent with some embodiments of the disclosure, the control sub-unit obtains the voltage of the voltage-sharing capacitor as well as the voltage and SOC information of the battery pack, so that the energy storage control unit can determine, based on the relevant information, whether the voltage-sharing capacitor pre-charge completion condition is met, and can select the energy storage sub-module as a charging energy storage sub-module by using a SOC sequencing and balancing policy, thereby achieving a more stable charge process and improving the grid connection reliability and the charging stability of the energy storage apparatus.

Consistent with some embodiments of the disclosure, the voltage transducer acquires the real-time voltage of the main energy transmission circuit, and the energy storage control unit performs PI control processing based on the real-time voltage to determine the quantity of energy storage sub-modules participating in charging, improving the accuracy of controlling the voltage of the main energy transmission circuit and improving the stability of the charge process.

Although this application has been described with reference to some embodiments, various modifications to this application and replacements of the components therein with equivalents can be made without departing from the scope of this application. In particular, as long as there is no structural conflict, the various technical features mentioned in the implementations can be combined in any manners. This application is not limited to the specific embodiments disclosed in this specification but includes all technical solutions falling within the scope of the claims.

What is claimed is:

1. A grid connection control method of an energy storage apparatus, wherein the energy storage apparatus comprises a plurality of energy storage sub-modules; the energy storage sub-module comprises a power unit and an energy storage unit; the power unit comprises a rectifying circuit and a voltage-sharing capacitor; the energy storage unit and the voltage-sharing capacitor are respectively connected in parallel with an output end of the rectifying circuit; the energy storage unit is capable of being connected to or disconnected from the output end of the rectifying circuit; input ends of all the rectifying circuits are connected in series to form a main energy transmission circuit; the main energy transmission circuit is capable of being connected to or disconnected from a direct-current bus of an electric power system; the method comprising:

in a state in which the main energy transmission circuit is disconnected from the direct-current bus, sequentially controlling the energy storage units of the energy storage sub-modules to be connected to corresponding voltage-sharing capacitors, so as to make the energy storage units pre-charge the corresponding voltage-sharing capacitors; and controlling the main energy transmission circuit to be connected to the direct-current bus under a condition that the voltage-sharing capacitor of each energy storage sub-module meets a voltage-sharing capacitor pre-charge completion condition.

2. The method according to claim 1, comprising:

under a condition that the main energy transmission circuit is connected to the direct-current bus, controlling the energy storage units of the energy storage sub-modules to be connected to the corresponding rectifying circuits according to a control policy to implement a charging treatment.

3. The method according to claim 2, wherein controlling the energy storage units of the energy storage sub-modules to be connected to the corresponding rectifying circuits according to the control policy to implement the charging treatment comprises:

selecting an energy storage sub-module as a charging energy storage sub-module based on SOC information of the energy storage sub-module, and controlling the charging energy storage sub-module to be connected to a corresponding rectifying circuit to implement a charging treatment under a condition that the main energy transmission circuit is connected to the direct-current bus.

4. The method according to claim 3, wherein selecting the energy storage sub-module as the charging energy storage sub-module based the SOC information of the energy storage sub-module comprises:

determining a corresponding participation quantity of energy storage sub-modules participating in charging;

determining, based on the participation quantity, a variation of the quantity of the energy storage sub-modules participating in charging under a condition that the participation quantity is greater than 0 and less than a total quantity of the energy storage sub-modules; and selecting, based on the SOC information and the variation of the energy storage sub-module, the energy storage sub-module as a charging energy storage sub-module by using a SOC sequencing and balancing policy.

5. The method according to claim 4, wherein selecting, based on the SOC information and the variation of the energy storage sub-module, the energy storage sub-module as the charging energy storage sub-module by using the SOC sequencing and balancing policy comprises:

under a condition that the variation is equal to 0 and a maximum SOC deviation is greater than a SOC deviation threshold, selecting an energy storage sub-module with a smallest SOC among all energy storage sub-modules that are not selected as the charging energy storage sub-modules as a new charging energy storage sub-module; and selecting an energy storage sub-module with a largest SOC among all the charging energy storage sub-modules as a to-be-excised energy storage sub-module;

wherein the maximum SOC deviation is a difference between a maximum SOC and a minimum SOC of the energy storage sub-module.

6. The method according to claim 4, wherein selecting, based on the SOC information and the variation of the energy storage sub-module, the energy storage sub-module as the charging energy storage sub-module by using a SOC sequencing and balancing policy comprises:

under a condition that the variation is greater than 0 and the electric power system outputs electrical energy to the main energy transmission circuit, selecting an energy storage sub-module with a smallest SOC and a quantity equal to the variation among all the energy storage sub-modules that are not selected as the charging energy storage sub-modules as a new charging energy storage sub-module; or under a condition that the variation is greater than 0 and the main energy transmission circuit outputs electrical energy to the electric power system, selecting an energy storage sub-module with a largest SOC and a quantity equal to the variation among all the energy storage sub-modules that are not selected as the charging energy storage sub-modules as a new charging energy storage sub-module.

7. The method according to claim 4, wherein selecting, based on the SOC information and the variation of the energy storage sub-module, the energy storage sub-module as the charging energy storage sub-module by using the SOC sequencing and balancing policy comprises:

under a condition that the variation is less than 0 and the electric power system outputs electrical energy to the main energy transmission circuit, selecting an energy storage sub-module with a largest SOC and a quantity equal to an absolute value of the variation among all the charging energy storage sub-modules as a to-be-excised energy storage sub-module; or under a condition that the variation is less than 0 and the main energy transmission circuit outputs electrical energy to the electric power system, selecting an energy storage sub-module with a smallest SOC and a quantity equal to an absolute value of the variation among all the charging energy storage sub-modules as a to-be-excised energy storage sub-module.

8. The method according to claim 4, wherein determining the corresponding participation quantity of energy storage sub-modules participating in charging comprises:

performing PI control processing based on a reference voltage and a real-time voltage of the main energy transmission circuit to determine the participation quantity.

9. The method according to claim 1, wherein the energy storage unit comprises: a battery pack; the battery pack is connected in series with a pre-charge circuit that is capable of being connected or disconnected, to form an energy storage circuit; the energy storage circuit is connected in parallel with an output end of a corresponding rectifying circuit; the pre-charge circuit comprises a first circuit capable of being connected or disconnected and a second circuit capable of being connected or disconnected, wherein the first circuit and the second circuit are connected in parallel; the first circuit is provided with a start resistor; the method further comprising:

under a condition that the energy storage unit pre-charges the corresponding voltage-sharing capacitor, controlling the first circuit to be connected and controlling the second circuit to be disconnected, so as to use the start resistor for limiting current; and under a condition that the voltage-sharing capacitor of the energy storage sub-module meets the voltage-sharing capacitor pre-charge completion condition and the charging energy storage sub-module is charged, controlling the second circuit to be connected to implement short-circuiting for the start resistor.

10. The method according to claim 1, wherein:

the voltage-sharing capacitor pre-charge completion condition comprises: a difference between a voltage of the voltage-sharing capacitor and a voltage of the corresponding energy storage unit is less than a voltage difference threshold.

11. An energy storage control unit, comprising:

a memory, and a processor coupled to the memory, wherein the processor is configured to execute the method according to claim 1 based on an instruction stored in the memory.

12. An energy storage system, comprising:

an energy storage apparatus and the energy storage control unit according to claim 11.

13. The energy storage system according to claim 12, wherein:

a connection circuit between the energy storage unit and the output end of the rectifying circuit is provided with a pre-charge circuit capable of being connected or disconnected.

14. The energy storage system according to claim 13, wherein:

the energy storage unit comprises: a battery pack, wherein the battery pack is connected in series with the pre-charge circuit to form an energy storage circuit, and the energy storage circuit is connected in parallel with an output end of a corresponding rectifying circuit.

15. The energy storage system according to claim 14, wherein:

the pre-charge circuit comprises a first circuit capable of being connected or disconnected and a second circuit capable of being connected or disconnected; the first circuit and the second circuit are connected in parallel; the first circuit is provided with a first start resistor and a first switch that are connected in series; and the second circuit is provided with a second switch.

16. The energy storage system according to claim 14, wherein:

an energy storage module sub-unit comprises: a control sub-unit, and the control sub-unit is connected to corresponding power unit and pre-charge circuit and is connected to the energy storage control unit; and the control sub-unit is configured to control a state of the power unit and control connection and disconnection of the pre-charge circuit after receiving a control instruction sent by the energy storage control unit.

17. The energy storage system according to claim 16, wherein:

the control sub-unit is further configured to obtain a voltage of a voltage-sharing capacitor as well as a voltage and SOC information of the battery pack, and send them to the energy storage control unit.

18. The energy storage system according to claim 12, further comprising:
a voltage transducer, configured to acquire a real-time voltage of a main energy transmission circuit and send the real-time voltage to the energy storage control unit.

19. The unit according to claim 11, further comprising:
a charge control module configured to, under a condition that the main energy transmission circuit is connected to the direct-current bus, control the energy storage units of the energy storage sub-modules to be connected to the corresponding rectifying circuits according to a control policy to implement a charging treatment.

20. An energy storage control unit, wherein an energy storage apparatus comprises a plurality of energy storage sub-modules; the energy storage sub-module comprises a power unit and an energy storage unit; the power unit comprises a rectifying circuit and a voltage-sharing capacitor; the energy storage unit and the voltage-sharing capacitor are respectively connected in parallel with an output end of the rectifying circuit; in addition, the energy storage unit is capable of being connected to or disconnected from the output end of the rectifying circuit; input ends of all the rectifying circuits are connected in series to form a main energy transmission circuit; the main energy transmission circuit is capable of being connected to or disconnected from a direct-current bus of an electric power system; the energy storage control unit comprising:
a voltage-sharing capacitor pre-charge module configured to, in a state in which the main energy transmission circuit is disconnected from the direct-current bus, sequentially control the energy storage units of the energy storage sub-modules to be connected to corresponding voltage-sharing capacitors, so as to make the energy storage units pre-charge the corresponding voltage-sharing capacitors; and
a circuit connection control module configured to control the main energy transmission circuit to be connected to the direct-current bus under a condition that the voltage-sharing capacitor of each energy storage sub-module meets a voltage-sharing capacitor pre-charge completion condition.

* * * * *